(12) United States Patent
Li et al.

(10) Patent No.: US 10,652,919 B1
(45) Date of Patent: May 12, 2020

(54) METHOD OF SIDE-LINK TRANSMISSION FOR ULTRA-RELIABLE AND LOW LATENCY COMMUNICATION

(71) Applicant: National Chung-Shan Institute of Science and Technology, Taoyuan (TW)

(72) Inventors: Chih-Lin Li, Taoyuan (TW); Yueh-Jir Wang, Taoyuan (TW); Shao-Yu Lien, Pingtung County (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 16/228,707

(22) Filed: Dec. 20, 2018

(51) Int. Cl.
*H04W 72/12* (2009.01)
*H04W 76/27* (2018.01)
*H04L 1/18* (2006.01)
*H04L 1/00* (2006.01)

(52) U.S. Cl.
CPC ....... *H04W 72/1268* (2013.01); *H04L 1/0003* (2013.01); *H04L 1/1896* (2013.01); *H04W 76/27* (2018.02)

(58) Field of Classification Search
CPC ........................ H04W 72/1268; H04W 76/27; H04L 1/0003; H04L 1/1896
See application file for complete search history.

(56) References Cited

U.S. PATENT DOCUMENTS

2019/0200355 A1\* 6/2019 Baldemair ........ H04W 72/0446

\* cited by examiner

*Primary Examiner* — Ronald B Abelson
(74) *Attorney, Agent, or Firm* — Winston Hsu

(57) ABSTRACT

A method of side-link transmission for ultra-reliable and low latency communication (URLLC), for a first user equipment (UE) of a wireless communication system is disclosed. The method comprises receiving a radio resource control, RRC, signaling for a first resource configuration, from a second UE of the side-link communication, wherein the second UE receives a grant-free uplink resource reserved for a grant-free uplink transmission, from a base station the wireless communication system, and transmitting a first RRC signal for a second resource configuration, to the second UE when the first resource configuration cannot support requirements of URLLC transmission.

20 Claims, 8 Drawing Sheets

METHOD OF SIDE-LINK TRANSMISSION FOR ULTRA-RELIABLE AND LOW LATENCY COMMUNICATION

BACKGROUND OF THE INVENTION

1. Field of the Invention

The present invention relates to a method used in a wireless communication system, and more particularly, to a method of side-link transmission for ultra-reliable and low latency communication.

2. Description of the Prior Art

3GPP Release 15 proposes grant-free uplink transmission scheme for UEs to perform ultra-reliable and low latency communication (URLLC) with the base station. In detail, 3GPP Release 15 discloses that the base station reserves semi-periodic resources (hereafter called grant-free uplink resources) for the UE to perform grant-free uplink transmission (e.g. URLLC UL transmission), as shown in FIG. 1. Therefore, if the UE has non-periodic data to transmit, it can transmit on the most recently reserved resources. On the other hand, if the UE does not have data to transmit, these reserved resources cannot be used by other UEs.

There are two types of resource scheduling for grant-free uplink transmission. In Type 1 resource scheduling, the base station informs the UE of resource configuration through a radio resource control (RRC) signaling, which includes parameters of a period of the semi-periodic resources, a time domain resource location, a frequency domain resource location, a modulation and channel coding pattern, number of retransmissions, and parameters related to power control, etc. After the base station informs the UE of the resource configuration by the RRC signaling, the scheduled resource is activated accordingly. In Type 2 resource scheduling, the base station informs the UE of resource configuration through the RRC signaling, but after the base station informs the UE of the resource configuration by the RRC signaling, the base station further transmits a physical layer signaling to the UE, to activate the scheduled resource. In addition, the base station transmits a physical layer signaling to deactivate the scheduled resource, to the UE.

However, there is no specification for the UE to perform URLLC transmission by side-link communication.

SUMMARY OF THE INVENTION

It is therefore an objective to provide a method of side-link communication for ultra-reliable and low latency communication to solve the above problem.

The present invention discloses a method of side-link transmission for ultra-reliable and low latency communication (URLLC), for a first user equipment (UE) of a wireless communication system. The method comprises receiving a radio resource control, RRC, signaling for a first resource configuration, from a second UE of the side-link communication, wherein the second UE receives a grant-free uplink resource reserved for a grant-free uplink transmission, from a base station the wireless communication system, and transmitting a first RRC signal for a second resource configuration, to the second UE when the first resource configuration cannot support requirements of URLLC transmission.

The present invention further discloses a method of side-link transmission for ultra-reliable and low latency communication (URLLC), for a first user equipment (UE) of a wireless communication system. The method comprises receiving a grant-free uplink resource reserved for a grant-free uplink transmission, from a base station, and transmitting a radio resource control, RRC, signaling for a first resource configuration associated to the grant-free uplink resource, to a second UE of the side-link communication.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
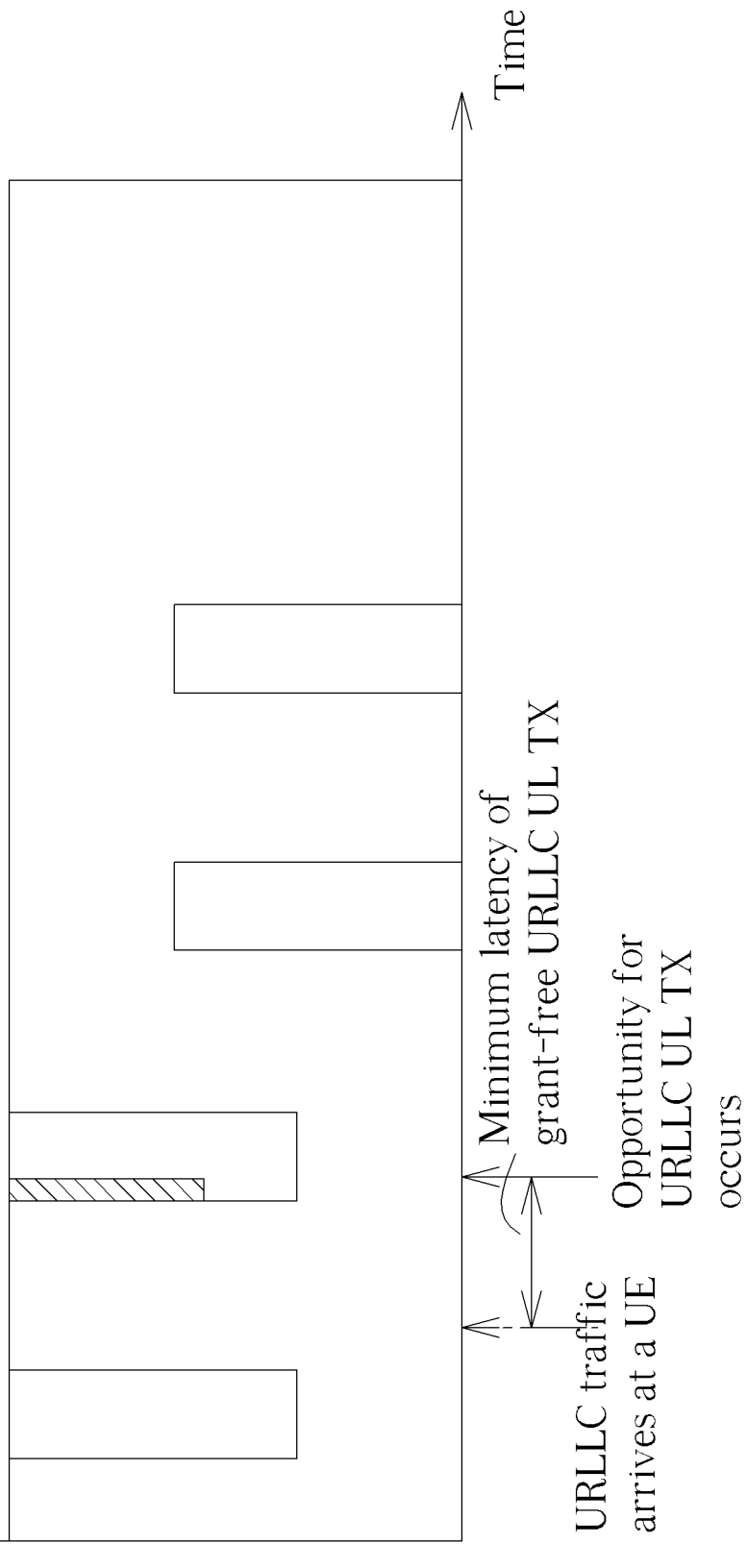
FIG. 1 is a schematic diagram of a grant-free uplink transmission on semi-periodic resources according to the prior art.
Figure 2:
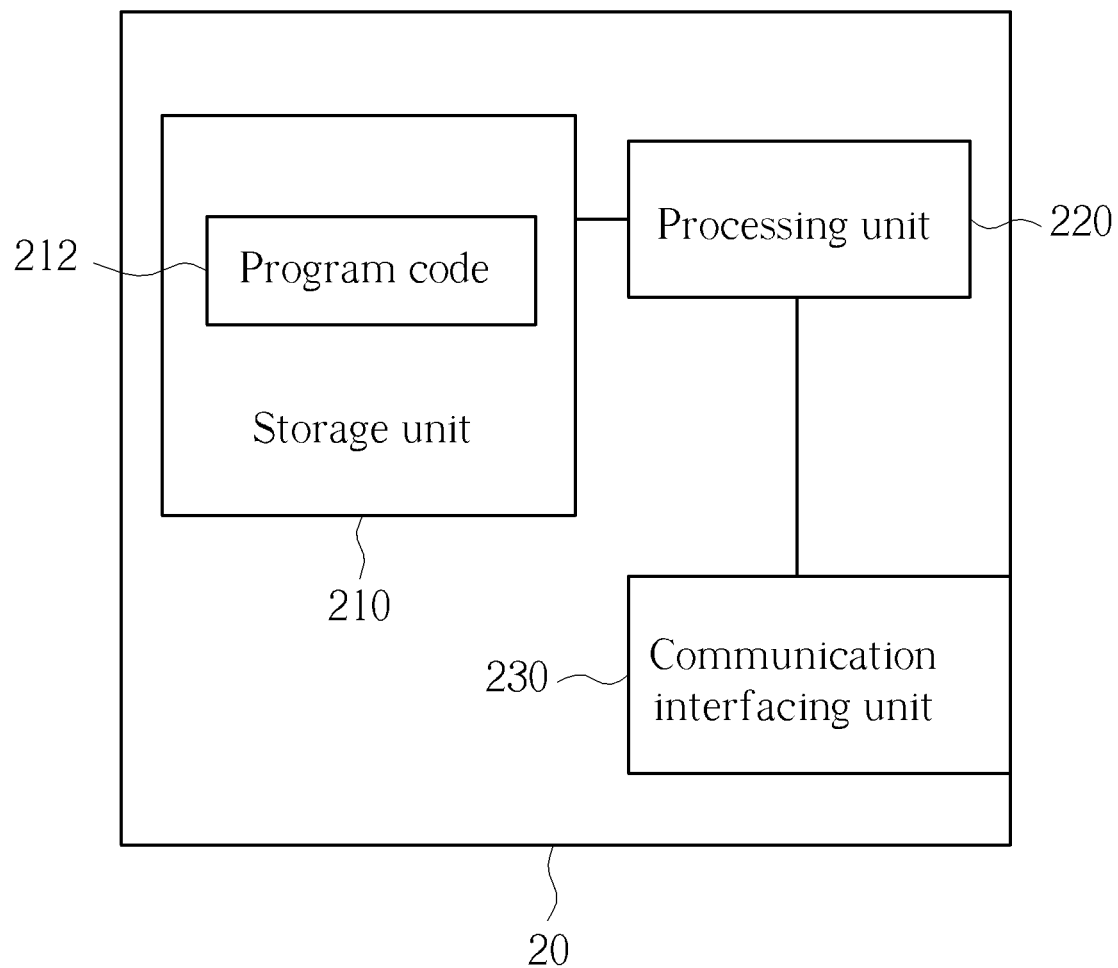
FIG. 2 is a schematic diagram of an exemplary communication device.

FIG. 2 is a schematic diagram of an exemplary communication device 20. The communication device 20 can be a user equipment (UE), such as a drone. The communication device 20 may include a processing unit 200 such as a microprocessor or Application Specific Integrated Circuit (ASIC), a storage unit 210 and a communication interfacing unit 220. The storage unit 210 may be any data storage device that can store program code 214, for access by the processing unit 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals according to processing results of the processing unit 200.

Figure 3:
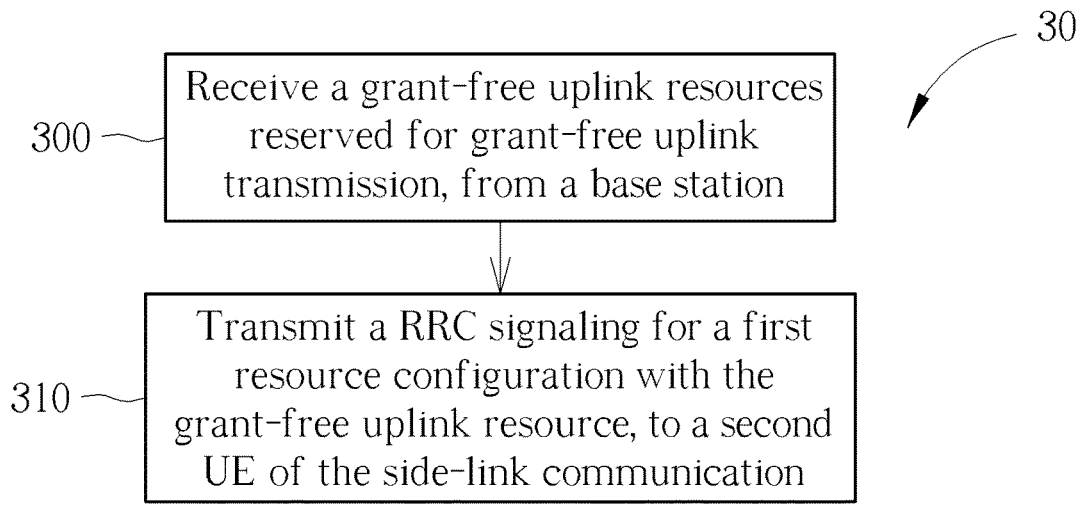
FIG. 3 is a flowchart of an exemplary process according to the present disclosure.

Please refer to FIG. 3, which is a flowchart of a process 30 according to an example of the present disclosure. The process 30 is utilized in the UE of FIG. 2, for side-link communication for URLLC transmission. The process 30 may be compiled into a program code 214 to be stored in the storage unit 210, and may include the following steps:

Step 300: Receive a grant-free uplink resources reserved for grant-free uplink transmission, from a base station.

Step 310: Transmit a RRC signaling for a first resource configuration with the grant-free uplink resource, to a second UE of the side-link communication.

According to the process 40, resource scheduling for side-link communication for URLLC transmission is realized within a UE (hereafter called master UE) obtaining grant-free uplink resources (namely semi-periodic resources reserved by the base station) from the base station. That is, the master UE configures resources to other UEs by side-link communication, such that other UEs of the side-link communication can perform. URLLC transmission with grant-free uplink resource.

Figure 4:
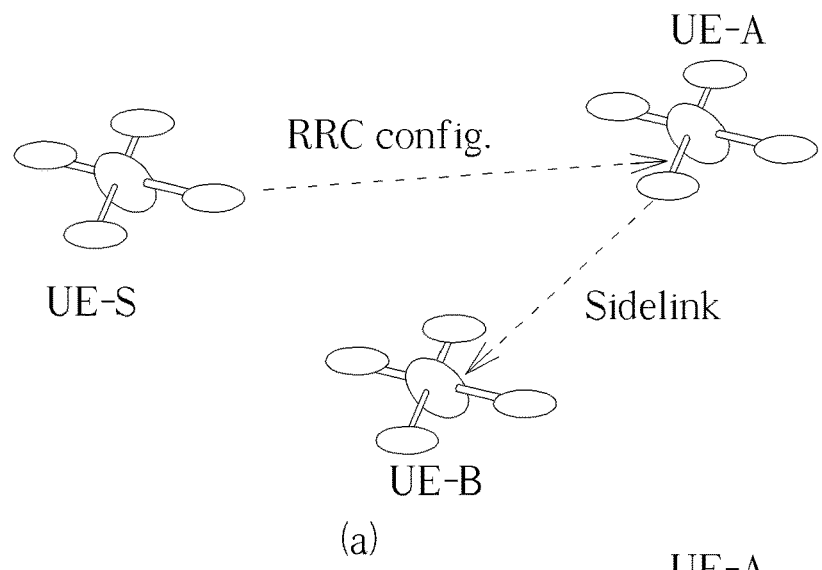
FIG. 4 is a schematic diagram of aside-link communication among drones according to the present disclosure.
Figure 4:
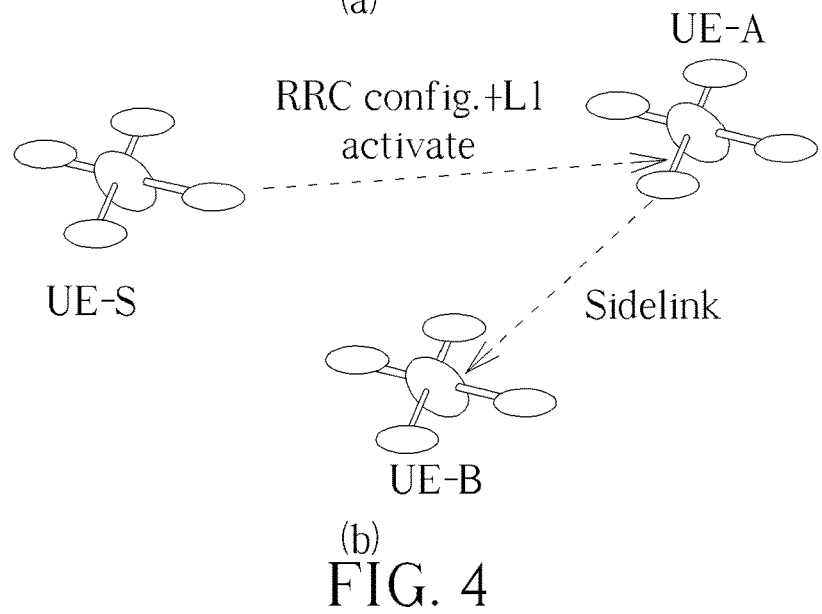

FIG. 4 is a schematic diagram of a side-link communication among drones according to the present disclosure. For ultra-reliable and low latency communication (URLLC) transmission by side-link communication, the drone UE-S of FIG. 4(a) is responsible for resource scheduling for other drones UE-A and UE-B, the drone UE-A is the transmitter of side-link communication, and the drone UE-B is the receiver of side-link communication. The drone UE-S obtains grant-free uplink resource from a base station (not shown in FIG. 4), and configures the obtained grant-free uplink resources for URLLC transmission by side-link communication.

Note that, the drone UE-S could apply the abovementioned Type 1 or Type 2 resource scheduling mechanism for resource configuration. With the Type 1 resource scheduling, the drone UE-S transmits the RRC signaling including resource configuration to the drone UE-A, and then the drone UE-A performs side-link transmission for URLLC based on the received resource configuration. With the Type 2 resource scheduling, as shown in FIG. 4(b), the drone UE-S transmits the RRC signaling including resource configuration along with physical layer signal L1 for activating the resource configuration to the drone UE-A, and then the drone UE-A performs side-link transmission for URLLC based on the received resource configuration.

Figure 5:
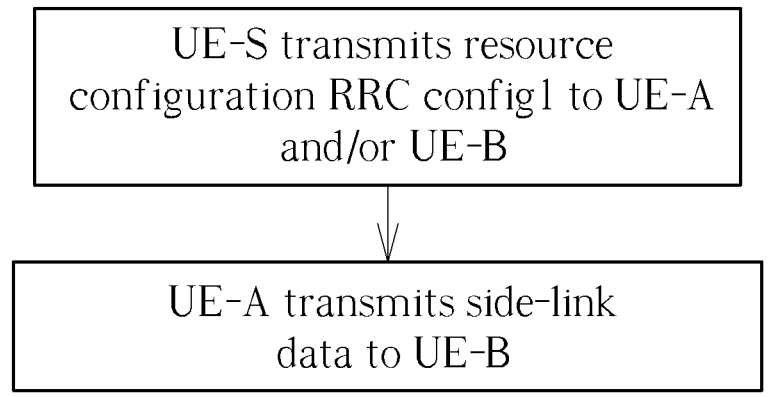
FIGS. 5-10 are schematic diagrams of side-link communication for ultra-reliable and low latency communications according to an embodiment of the present disclosure.

FIGS. 5-10 are schematic diagrams of side-link communication for URLLC transmission according to an embodiment of the present disclosure. In FIG. 5, the drone UE-S transmits RRC signal including resource configuration RRC config1 to the drone UE-A and/or the drone UE-B. The resource configuration RRC config1 includes parameters of a period of the semi-periodic resources, a time domain resource location, a frequency domain resource location, a modulation and channel coding pattern, number of retransmissions, and parameters related to power control, etc. After the UE-A receives the resource configuration RRC config1, the drone UE-A can immediately transmits side-link data (e.g. URLCC transmission) to the drone UE-B. In other words, the resource configuration RRC config1 is automatically activated upon RRC single transmitted.

Figure 6:
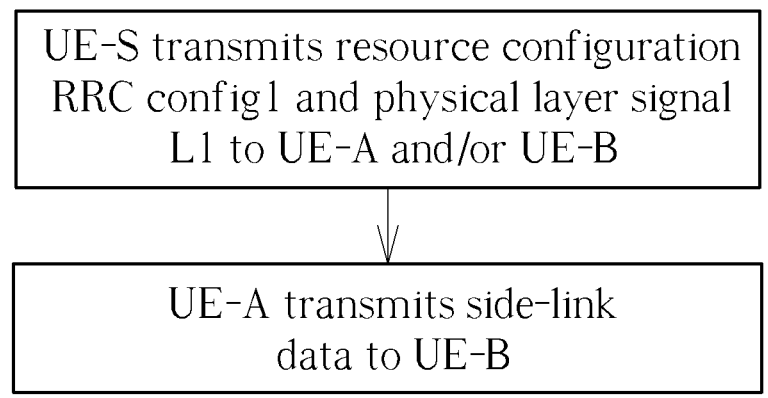

In FIG. 6, the drone UE-S transmits RRC signal including the resource configuration RRC config1 to the drone UE-A and/or the drone UE-B. In addition, the drone UE-S further transmits the physical layer signal L1 to the drone UE-A and/or the drone UE-B. After the UE-A receives the resource configuration RRC config1 along with the physical layer signal L1, the drone UE-A transmits side-link data (e.g. URLCC transmission) to the drone UE-B. In other words, the resource configuration RRC config1 is activated after physical layer signal L1 transmitted.

Figure 7:
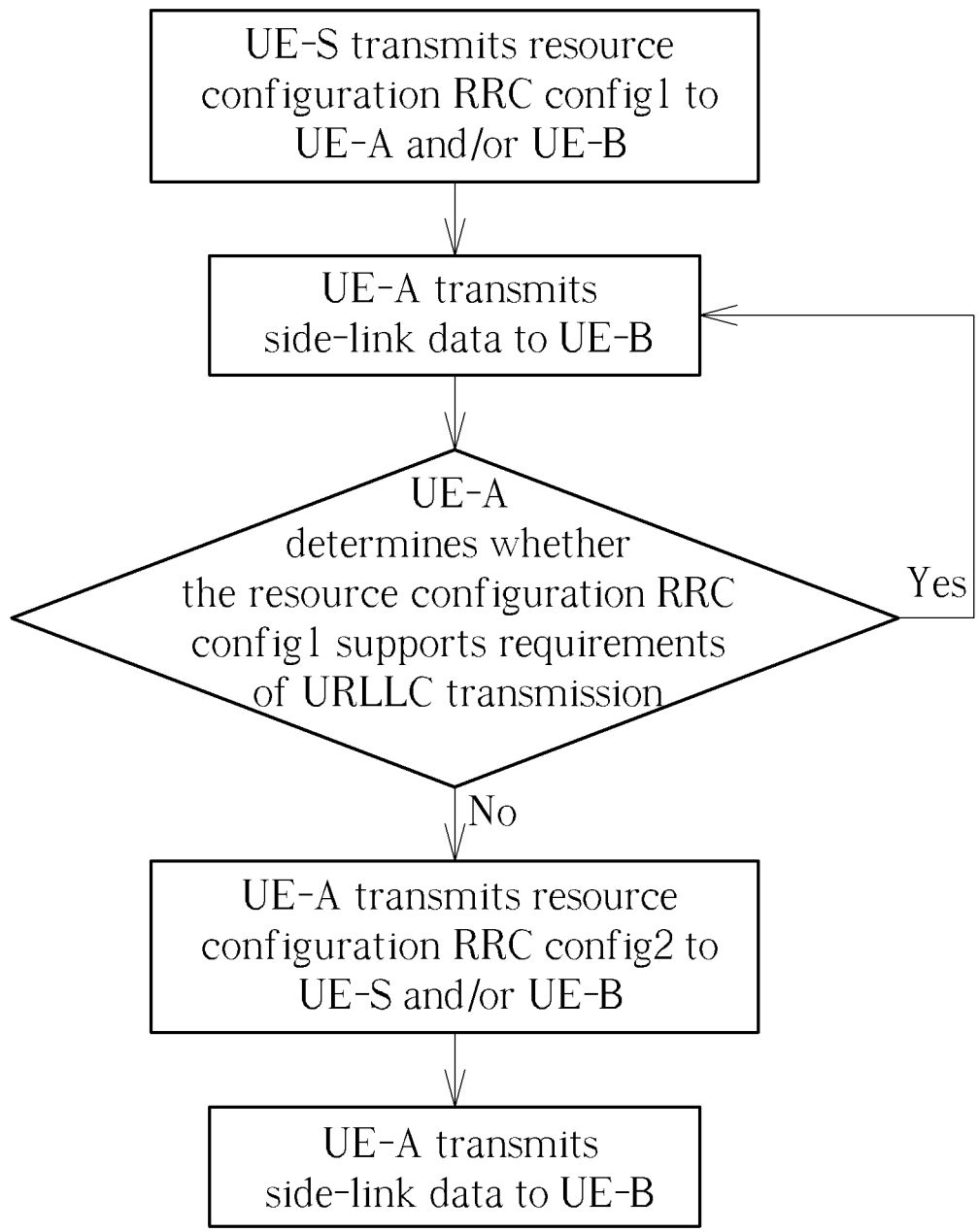

In addition, the present invention discloses a method for fulfilling different requirements of side-link transmission for URLLC. Reference is made to FIG. 7. After the drone UE-A receives the resource configuration RRC config1, but the resource configuration RRC config1 cannot support requirements of URLLC transmission, for example, an amount of radio resource is not enough for URLLC transmission, the drone UE-A transmits RRC signal including resource configuration RRC config2 to the drone UE-S and/or the drone UE-B. The drone UE-A then transmits side-link data to the drone UE-B with resource configuration RRC config2. On the other hand, if the resource configuration RRC config1 support requirements of URLLC transmission, the drone UE-A transmits side-link data to the drone UE-B with resource configuration RRC config1.

Note that, the resource configuration RRC config2 includes parameters, which is changeable by the drone UE-A, such as a time domain resource location, a frequency domain resource location, a modulation and channel coding pattern, number of retransmissions, and parameters related to power control. In detail, the drone UE-S transmits RRC signal for indicating parameters that is changeable in the resource configuration RRC config1 to the drone UE-A, such that the drone UE-A transmits resource configuration RRC config2 including the changeable parameters to the drone UE-S.

Figure 8:
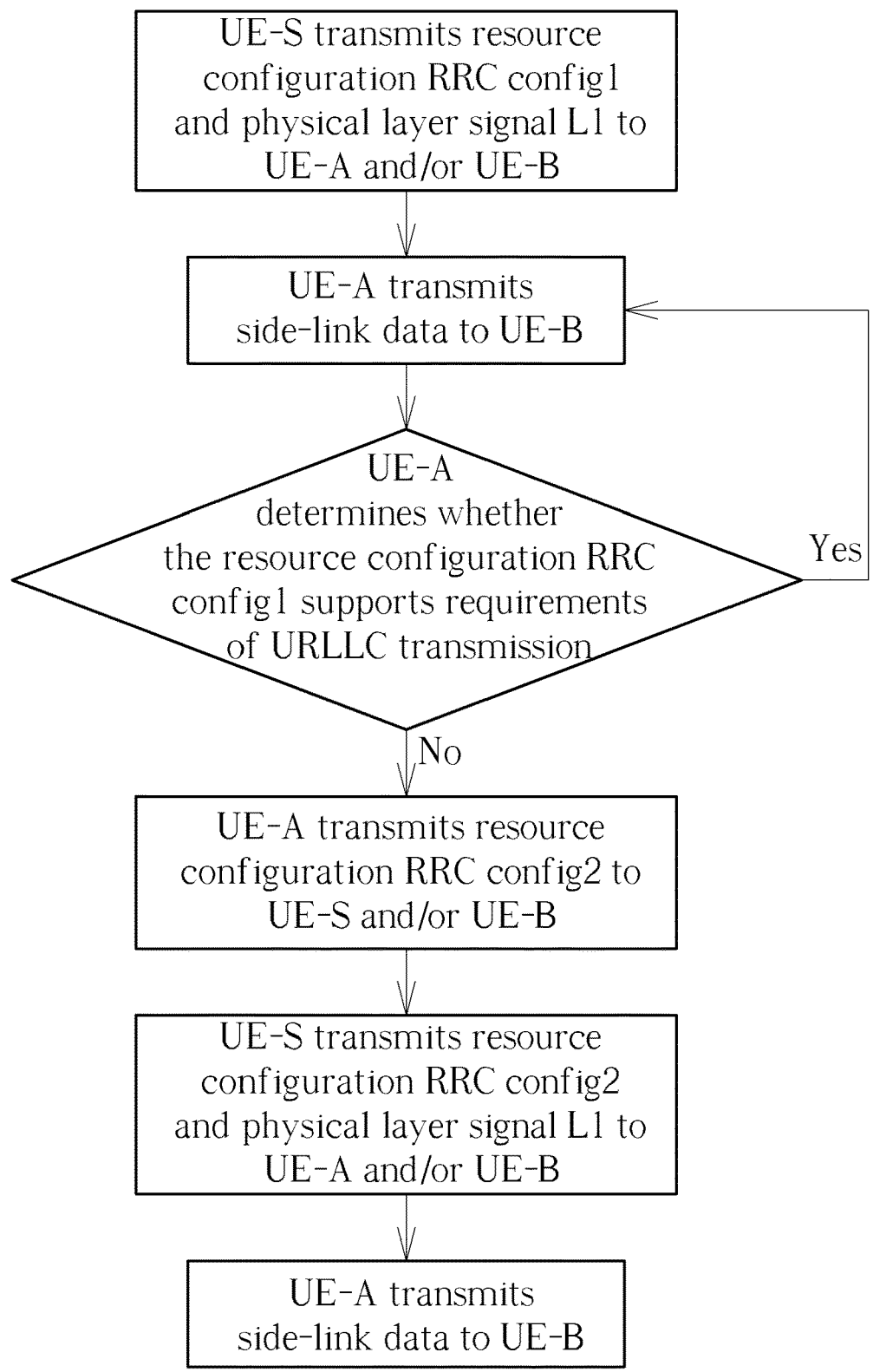

In FIG. 8, compared to FIG. 7, after the drone UE-A transmits RRC signal including resource configuration RRC config2 to the drone UE-S and/or the drone UE-B. The drone UE-S transmits RRC signal including resource reconfiguration along with the physical layer signal L1 to the drone UE-A. Note that, the resource reconfiguration transmitted by the drone UE-S may be different to the resource configuration RRC config2 transmitted by the drone UE-A. After the drone UE-A receives the resource reconfiguration, the UE-A transmits side-link data to the drone UE-B with the resource reconfiguration.

Figure 9:
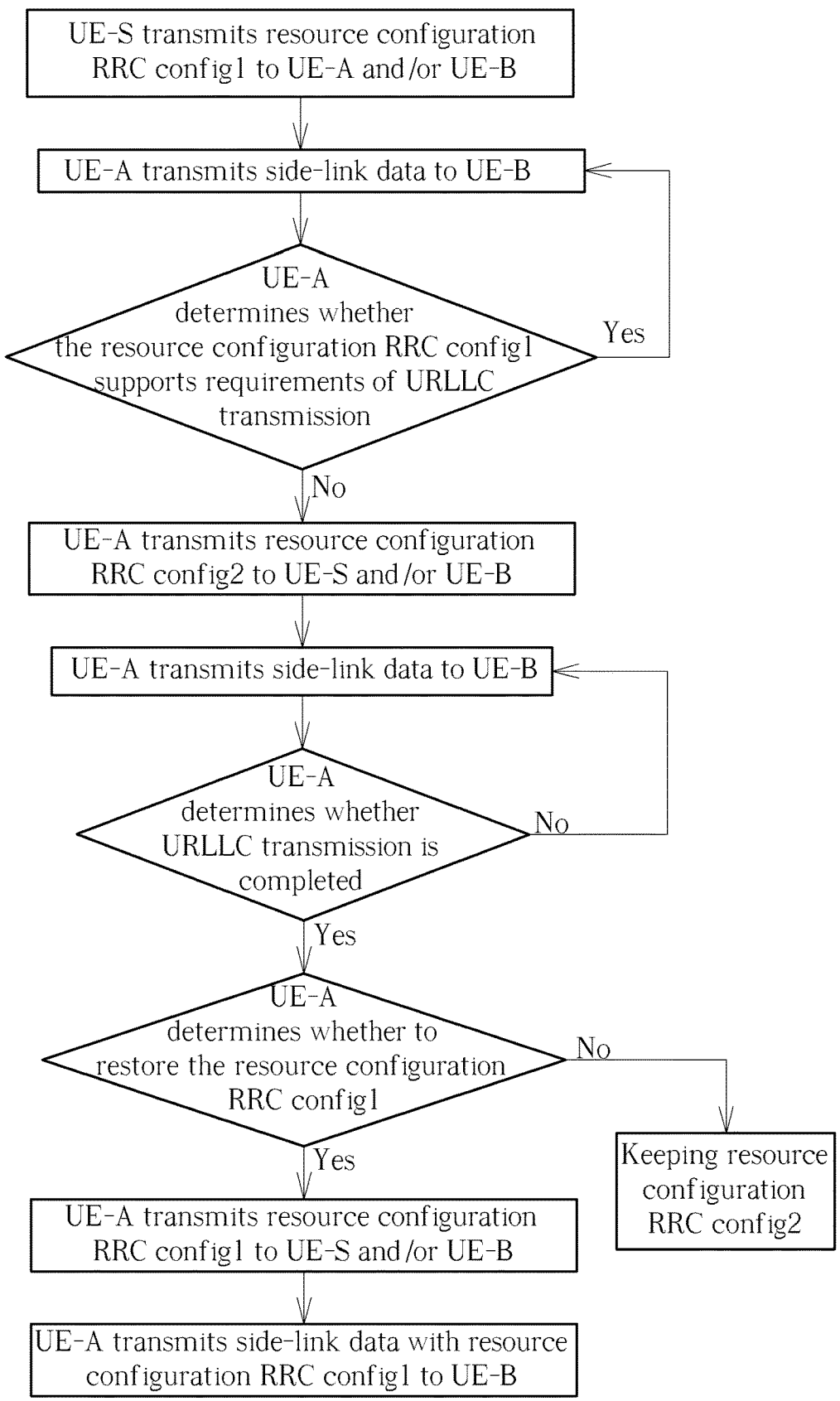

In FIG. 9, after the drone UE-A finish the URLLC transmission, the drone UE-A determines whether to restore the resource configuration RRC config1 from the resource configuration RRC config2. If the drone UE-A determines to restore the resource configuration RRC config1, the drone UE-A transmits RRC signal including resource configuration RRC config1 to the drone UE-S and/or the drone UE-B, and then transmits side-link data to the drone UE-B with the resource configuration RRC config1. On the other hand, if the drone UE-A determines not to restore the resource configuration RRC config1, the drone UE-A keeps using resource configuration RRC config2 for URLLC transmission.

In other words, the drone UE-A deactivates the resource configuration RRC config2 by transmitting the RRC signal including the resource configuration RRC config1 to the drone UE-S and/or the drone UE-B. After that, the resource configuration RRC config2 is immediately deactivated, and the resource configuration RRC config1 is activated for side-link data transmission.

Figure 10:
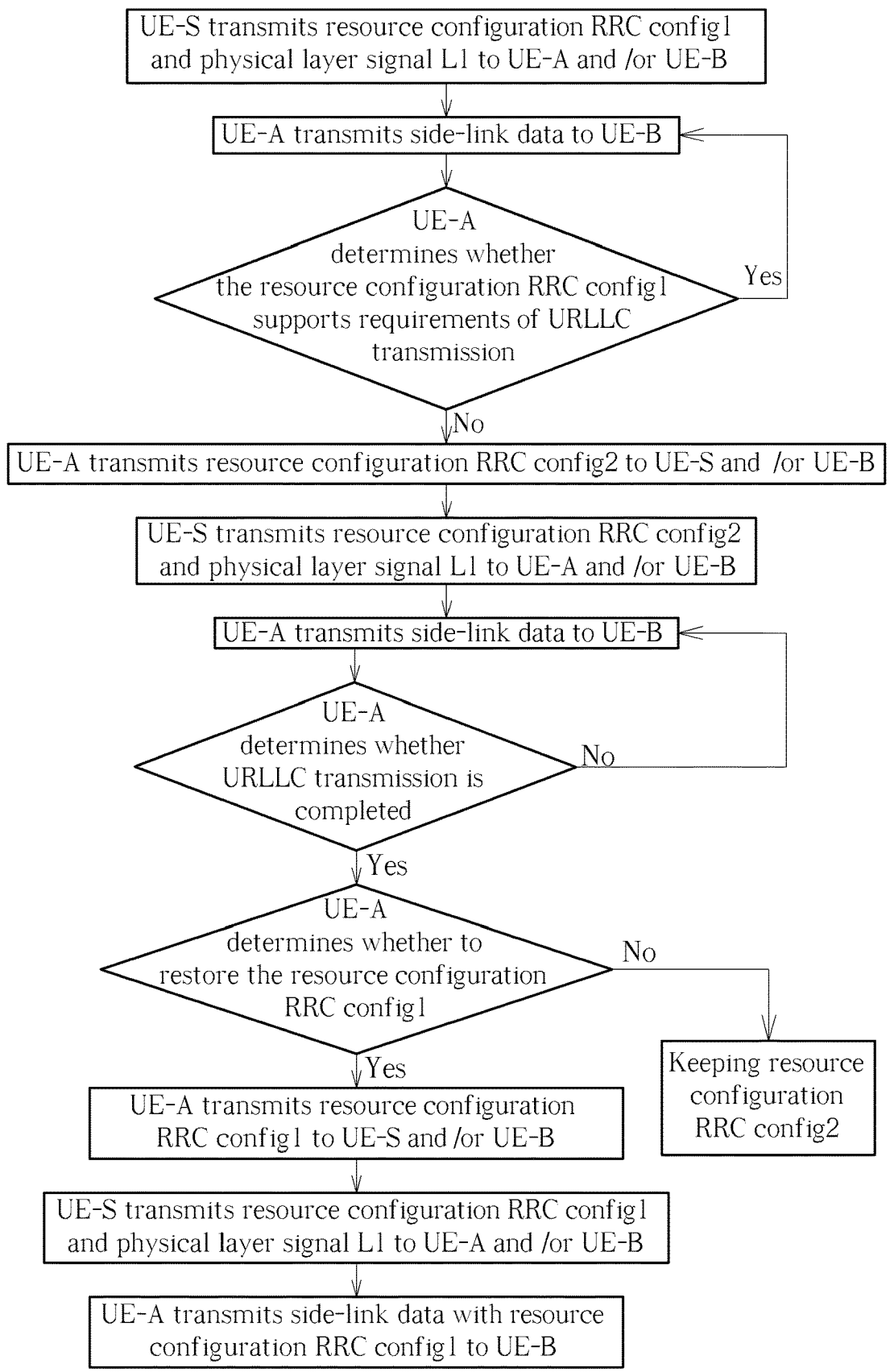

In FIG. 10, after the drone UE-A transmits RRC signal including resource configuration RRC config1 to the drone UE-S and/or the drone UE-B, the drone UE-S transmits RRC signal including resource configuration RRC config1 and physical layer signal L1 to the drone UE-A and/or the drone UE-B. Then, the drone UE-A transmits side-link data to the drone UE-B with the resource configuration RRC config1. In other words, the resource configuration RRC config2 is deactivated only after the drone UE-S transmits RRC signal including resource configuration RRC config1 and physical layer signal L1 (i.e. an acknowledgement of deactivating resource configuration RRC config2) to the drone UE-A and/or the drone UE-B. Then, the resource configuration RRC config1 is activated for side-link data transmission.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 30.

In conclusion, the present invention addresses to resource scheduling by a drone to configure grant-free uplink resource for RULLC transmission to other drones with the side-link communication. In addition, the drone can dynamically change parameters of resource configuration for URLLC transmission, so as to fulfill the requirements of URLLC transmission. Therefore, RULLC transmission could be applied in a wireless communication system without base station scheduling resource.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of side-link transmission for ultra-reliable and low latency communication (URLLC), for a first user equipment (UE) of a wireless communication system, the method comprising:
   receiving a radio resource control, RRC, signaling for a first resource configuration, from a second UE of the side-link communication, wherein the second UE receives a grant-free uplink resource reserved for a grant-free uplink transmission, from a base station the wireless communication system; and
   transmitting a first RRC signal for a second resource configuration, to the second UE when the first resource configuration cannot support requirements of URLLC transmission;
   wherein the transmitting step comprises:
   transmitting the first RRC signal for the second resource configuration, to the second UE and a third UE of the side-link communication when the first resource configuration cannot support requirements of data transmission for the URLLC.

2. The method of claim 1, wherein the second resource configuration includes parameters of at least one of a time domain resource location, a frequency domain resource location, a modulation and channel coding pattern, number of retransmissions, and parameters related to power control.

3. The method of claim 1, further comprising:
   performing the data transmission for the URLLC with the third UE of the side-link communication according to the second resource configuration.

4. The method of claim 1, wherein the receiving step comprise:
   receiving the RRC signaling for the first resource configuration along with a physical layer signal for activating the first resource configuration, from the second UE of the side-link communication.

5. The method of claim 1, further comprising:
   receiving a second RRC signal for a resource reconfiguration, from the second UE; and
   performing the data transmission for the URLLC with the third UE of the side-link communication according to the resource reconfiguration.

6. The method of claim 3, further comprising:
   determining whether to restoration of the first resource configuration;
   transmitting a third RRC signal for deactivating the second resource configuration, to the second UE when determining to restoration of the first resource configuration; and
   keeping the second resource configuration when determining not to restoration of the first resource configuration of the RRC signal.

7. The method of claim 5, further comprising:
   determining whether to restoration of the first resource configuration;
   transmitting a third RRC signal for deactivating the resource reconfiguration, to the second UE when determining to restoration of the first resource configuration; and
   keeping the resource reconfiguration when determining not to restoration of the first resource configuration.

8. The method of claim 6, further comprising:
   performing the data transmission for the URLLC with the third UE according to the first resource configuration when determining to restoration of the first resource configuration.

9. The method of claim 7, further comprising:
   performing the data transmission for the URLLC with the third UE according to the first resource configuration when determining to restoration of the first resource configuration.

10. The method of claim 6, further comprising:
    receiving a fourth RRC signal corresponding to the third RRC signal for acknowledgement of deactivating the second resource configuration, from the second UE.

11. The method of claim 7, further comprising:
    receiving a fourth RRC signal corresponding to the third RRC signal for acknowledgement of deactivating the resource reconfiguration, from the second UE.

12. The method of claim 1, further comprising:
    receiving a fifth RRC signal for indicating parameters that is changeable in the first resource configuration by the first UE, from the second UE, whereby the first UE transmits the first RRC signal for the second resource configuration including the changeable parameters, to the second UE.

13. A method of side-link transmission for ultra-reliable and low latency communication (URLLC), for a first user equipment (UE) of a wireless communication system, the method comprising:
    receiving a grant-free uplink resource reserved for a grant-free uplink transmission, from a base station;
    transmitting a radio resource control, RRC, signaling for a first resource configuration associated to the grant-free uplink resource, to a second UE of the side-link communication;
    receiving a first RRC signal for a second resource configuration, from the second UE; and
    transmitting a second RRC signal for a resource reconfiguration to the second UE and a third UE of the side-link communication.

14. The method of claim 13, wherein the second resource configuration includes parameters of at least one of a time domain resource location, a frequency domain resource location, a modulation and channel coding pattern, number of retransmissions, and parameters related to power control.

15. The method of claim 13, further comprising:
    receiving a third RRC signal for deactivating the second resource configuration, from the second UE.

16. The method of claim 15, further comprising:
    transmitting a fourth RRC signal corresponding to the third RRC signal for acknowledgement of deactivating the second resource configuration, to the second UE.

17. The method of claim 13, further comprising:
    receiving a third RRC signal for deactivating the resource reconfiguration, from the second UE.

18. The method of claim 17, further comprising:
    transmitting a fourth RRC signal corresponding to the third RRC signal for acknowledgement of deactivating the resource reconfiguration, to the second UE.

19. The method of claim 13, further comprising:
transmitting a fifth RRC signal for indicating parameters that is changeable in the first resource configuration by the second UE, to the second UE.

20. The method of claim 13, wherein the transmitting step comprises:
transmitting the RRC signaling for the first resource configuration along with a physical layer signal for activating the first resource configuration, to the second UE.

\* \* \* \* \*